(12) United States Patent
Grace et al.

(10) Patent No.: US 9,080,766 B2
(45) Date of Patent: Jul. 14, 2015

(54) ENHANCED EMISSION CONTROL FOR OUTDOOR WOOD-FIRED BOILERS

(75) Inventors: Lance C. Grace, Alamogordo, NM (US); Tyler Mainord Grace, Alamogordo, NM (US)

(73) Assignee: Clear Skies Unlimited, Inc., Albuquerque, NM (US)

( * ) Notice: Subject to any disclaimer, the term of this patent is extended or adjusted under 35 U.S.C. 154(b) by 837 days.

(21) Appl. No.: 13/217,215

(22) Filed: Aug. 24, 2011

(65) Prior Publication Data

US 2012/0048158 A1    Mar. 1, 2012

Related U.S. Application Data

(60) Provisional application No. 61/376,355, filed on Aug. 24, 2010.

(51) Int. Cl.
B01D 53/86     (2006.01)
F23G 7/07      (2006.01)
(Continued)

(52) U.S. Cl.
CPC .............. F23B 90/08 (2013.01); B01D 53/864 (2013.01); F23G 7/07 (2013.01); F23L 9/04 (2013.01);
(Continued)

(58) Field of Classification Search
CPC ........... B01D 53/864; F23L 9/04; F23G 7/07; F23B 90/08; F24B 1/006; F24B 5/025
USPC ................. 422/173, 177, 180, 182, 202, 203; 110/210, 214, 302
See application file for complete search history.

(56) References Cited

U.S. PATENT DOCUMENTS 4,373,452 A * 2/1983 Van Dewoestine ........... 422/177
4,502,395 A * 3/1985 Barnett ......................... 110/214
(Continued)

FOREIGN PATENT DOCUMENTS

JP         06-229530      8/1994
JP         07-208701      8/1995
WO    WO 2009/144393    * 12/2009

OTHER PUBLICATIONS

International Search Report from the International Application No. PCT/US2011/049024 dated Apr. 24, 2012.

*Primary Examiner* — Jill Warden
*Assistant Examiner* — Joyce L Woodard
(74) *Attorney, Agent, or Firm* — Deborah A. Peacock; Justin R. Jackson; Peacock Myers, P.C.

(57) ABSTRACT

An emission control apparatus which can be used on an outdoor wood-fired boiler. Ambient air, which has a much higher concentration of available oxygen in relation to exhaust gases, is caused to be heated before being passed through catalyst-coated media along with exhaust gases, thereby improving the performance of the catalytic reaction. An embodiment also relates to an emission control apparatus having a housing with an internal wall and an external wall, the internal wall defining an exhaust flow path and having a catalyst-coated media disposed therein, at least one ambient air duct disposed within the housing between the internal wall and the external wall, where each ambient air duct includes an air inlet in the external wall of the housing and an air outlet in the internal wall of the housing in communication with the catalyst-coated media, insulation disposed within the housing between the internal wall and the external wall, and wherein the at least one ambient air duct and insulation are positioned such that, during operation of the emission control apparatus, ambient air enters through the air inlet, travels upwardly through the air duct on a cool exterior side of the insulation before turning and traveling back down on a hot interior side of the insulation where the ambient air is heated from conduction through the internal wall of the housing before being introduced into the catalyst-coated media.

19 Claims, 25 Drawing Sheets

(51) Int. Cl.
*F23B 90/08* (2011.01)
*F23L 9/04* (2006.01)

(52) U.S. Cl.
CPC ....... *B01D 2257/502* (2013.01); *B01D 2257/70* (2013.01); *B01D 2258/0283* (2013.01); *B01D 2259/65* (2013.01)

(56) References Cited

U.S. PATENT DOCUMENTS

| | | | |
|---|---|---|---|
| 4,584,177 A * | 4/1986 | Fernbach et al. | 422/173 |
| 5,041,268 A * | 8/1991 | Inovius | 110/214 |
| 6,237,587 B1 | 5/2001 | Sparling et al. | |
| 2007/0256616 A1 * | 11/2007 | Tiegs | 110/345 |
| 2009/0325112 A1 | 12/2009 | Tanaka et al. | |

* cited by examiner

ENHANCED EMISSION CONTROL FOR OUTDOOR WOOD-FIRED BOILERS

CROSS-REFERENCE TO RELATED APPLICATIONS

This application claims priority to and the benefit of the filing of U.S. Provisional Patent Application Ser. No. 61/376,355, entitled "Outdoor Wood-Fired Boiler Emission Control Apparatus", filed on Aug. 24, 2010, and the specification thereof is incorporated herein by reference.

BACKGROUND OF THE INVENTION

1. Field of the Invention (Technical Field)

Embodiments of the present invention relate to improvements for an outdoor wood-fired boiler ("OWB") which directs pollutant filled exhaust through a catalyst-coated media. More particularly, embodiments of the present invention relate to emission control apparatuses, methods, and systems for an OWB.

2. Description of Related Art

For centuries throughout the world, people have used outdoor wood-fired boilers for warmth. Recently, however, air pollution has rapidly become an increasing problem in both industrialized and developing nations. Combustion of fuel sources is a significant contributor of such pollution. Some nations, including the United States, have enacted environmental regulations in an effort to curb the increasing rate of air pollution.

In light of the environmental regulations as well as the general consciousness of the community, a number of devices have been made available for fuel-burning stoves which rely on the exhaust of the stove passing through a catalyst-coated media which reduces the amount of air pollutants which would otherwise be emitted (see for example U.S. Pat. No. 6,237,587). Because emission-cleansing reactions that are supported by catalysts often require a source of available oxygen, the efficiency of emission control reactions for known catalysts can thus be greatly improved by providing a source of available oxygen. While such an action sounds simple, its effective implementation is anything but. This is primarily because the emission control reactions associated with known catalysts typically take place only at relatively high temperatures. Accordingly, any source of available oxygen that is below the required reaction temperature will thus not only fail to take part in the reaction, but will also remove heat from the catalyst, thus requiring the addition of even more heat to the system simply to meet the status quo.

There is thus a present need for an apparatus for an OWB which introduces available oxygen to the exhaust flow and the catalyst-coated media at a temperature which is significantly greater than that of the ambient air, thus increasing the efficiency of the catalytic reaction process.

BRIEF SUMMARY OF EMBODIMENTS OF THE PRESENT INVENTION

An embodiment of the present invention relates to an emission control apparatus which comprises an exhaust flow path, catalyst-coated media disposed in the exhaust flow path, an ambient air inlet, and an ambient air duct, the duct communicable with the ambient air inlet at a first end and the catalyst-coated media at a second end. In one embodiment the emission control apparatus further comprises an insulator. In another embodiment, the ambient air duct travels around a first side and a second side of the insulator. In another embodiment the insulator comprises an inside passageway and the first side of the insulator comprises an outside of the insulator and the second side comprises the inside passageway of the insulator. Additionally, the emission control apparatus can comprise a housing, or can comprise a first and second ends that are connectable with conventional flue pipes, or can comprise a catalyst cleaner and initiator. The catalyst cleaner and initiator can be disposed such that it heats the catalyst-coated media and can also be electric. The emission control apparatus can further comprise a fan, and the fan can comprise an outlet which is communicable with the ambient air inlet. In one embodiment, the emission control apparatus can comprise a control system. The control system can control an element selected from a list consisting of a fan, a catalyst cleaner and initiator, and a combination thereof. In another embodiment the second end of the ambient air duct comprises a plurality of openings. In another embodiment of the emission control apparatus, the emission control apparatus is arranged such that it is at least substantially oriented, the catalyst-coated media is disposed in a lower portion of the exhaust flow path and the air inlets are disposed on a lower exterior portion of the emission control apparatus. In another embodiment, the emission control apparatus comprises a catalyst-coated media holder. In one embodiment, the catalyst-coated media comprises a reticulated structure.

An embodiment of the present invention also relates to an apparatus which comprises an exhaust-flow path, the path comprising an exhaust entrance at a first end and an exhaust outlet at a second end, an ambient air entrance, an ambient air duct, wherein a first end of the air duct forms the ambient air entrance comprising an opening on an exterior of the apparatus and wherein a second end of the air duct forms an opening in fluid communication with the exhaust-flow path, a catalyst-coated media holder, the holder disposed in the exhaust-flow path and an insulator, the insulator comprising a first side and a second side, and disposed at least partially around the exhaust-flow path. In one embodiment the insulator comprises a thermal insulator. In another embodiment, the insulator is at least substantially cylindrically-shaped with a central opening traversing along a primary axis thereof. The insulator can also be positioned such that said exhaust-flow path is disposed within said central opening.

An embodiment of the present invention also relates to an emission control apparatus disposed on an outdoor wood-fired boiler (OWB) comprising a housing that comprises one or more air ducts having one or more inlets, media disposed within said housing, one or more outlets disposed on said one or more air ducts, a catalyst cleaner and initiator disposed within said housing and near said media, and an electrical connection disposed on said catalyst cleaner and initiator.

An embodiment of the present invention also relates to an emission control apparatus that comprises an emission inlet at a lower end, the inlet configured to attach to an outlet of an OWB, an emission outlet at an upper end, said upper end attachable to a bottom section of a flue pipe, a middle portion, said middle portion comprising a cross sectional area at least 30% larger than a cross sectional area of the flue pipe, and a media holding structure disposed within said middle portion, the media holding structure configured such that media held thereby can be rotatably positioned about an at least substantially horizontal axis. In one embodiment, this emission control apparatus further comprises a reticulated structure of catalyst-coated media.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 9-21 illustrate various stages of completion of the construction of an apparatus in accordance with teachings of the present invention.

DETAILED DESCRIPTION OF THE INVENTION

Figure 1:
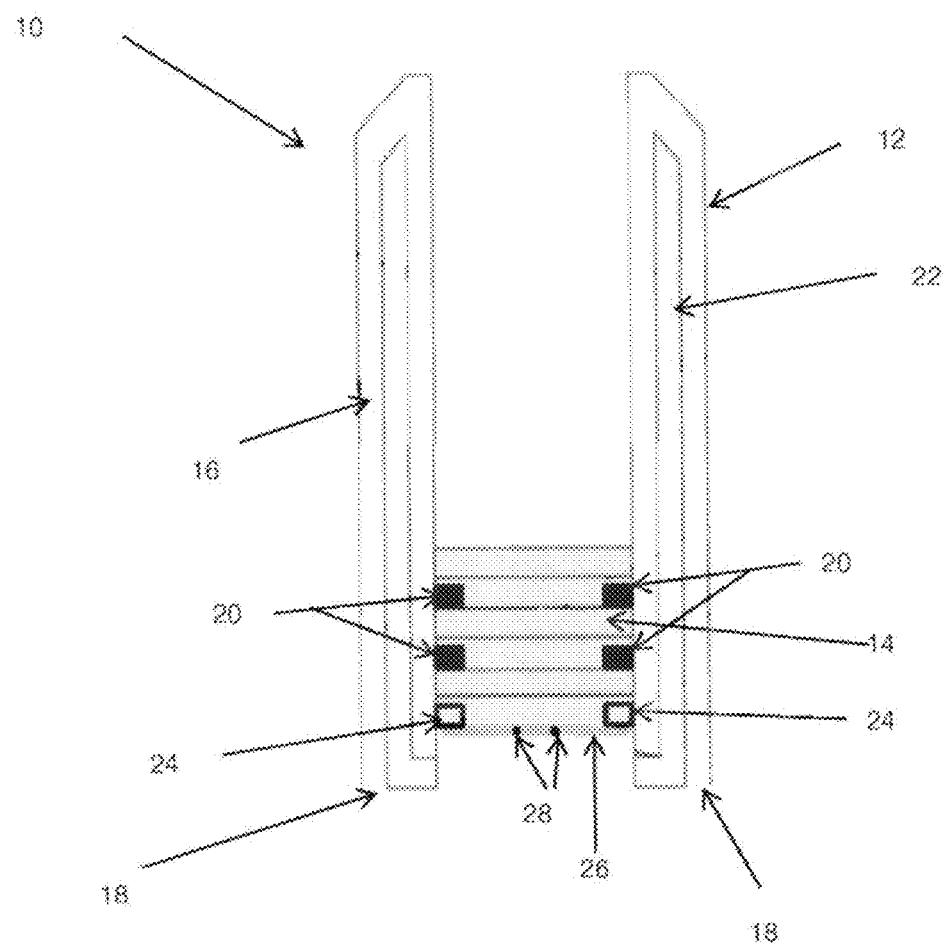
FIG. 1 is a cutaway drawing which schematically illustrates various components of an emission control apparatus according to an embodiment of the present invention.
Figure 2:
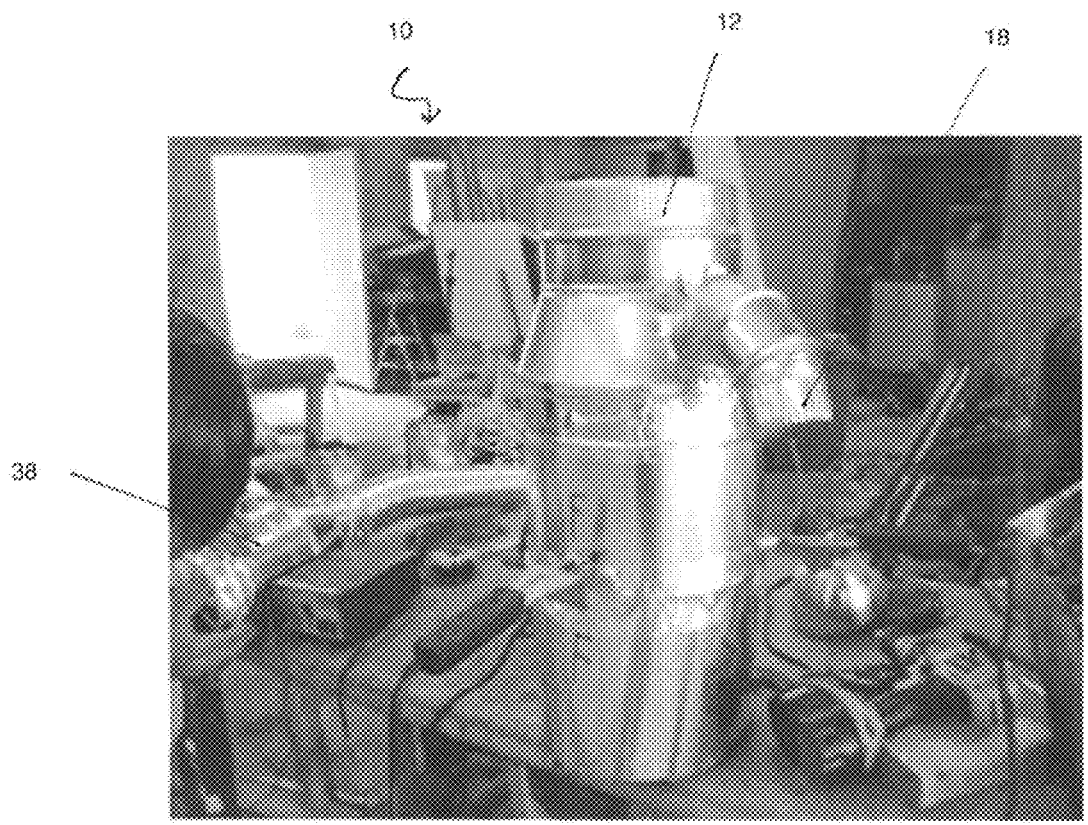
FIG. 2 illustrates a perspective view of an emission control apparatus according to an embodiment of the present invention.

Embodiments of the present invention relate to an emission control apparatus for an outdoor wood-fired boiler ("OWB"). The emission control apparatus can be incorporated into new OWBs and/or can be retro-fitted onto existing OWBs.

As used throughout this application, unless otherwise noted, the terms "outdoor wood-fired boiler" and "OWB" shall also be understood to include wood-fired hydronic heaters, indoor and/or outdoor heaters, boilers, fire boxes, and/or combustion chambers which rely on solid, liquid, and/or gaseous fuels, combinations thereof, and the like, including but not limited to interior wood-fueled heaters and/or outdoor wood-fueled heaters. As used throughout this application, the terms "initiator" and "catalyst cleaner and initiator" are used interchangeably and are intended to include any device, apparatus, system, and/or method capable of elevating the temperature of a catalyst-coated medium at will or upon predetermined conditions. The degree of temperature elevation can include temperatures sufficient to only slightly heat a catalyst-coated medium and/or temperatures to burn off deposits formed on the catalyst-coated medium. Accordingly, they can be electrically powered, gas-powered, and/or a combination thereof.

Referring now to the figures, particularly FIGS. 1-6, emission control apparatus 10 preferably includes housing 12 and catalyst-coated media 14 having an external wall spaced from an internal wall, and catalyst-coated media 14 disposed within an exhaust flow path defined by the internal wall of housing 12. Housing 12 preferably includes one or more ambient air ducts 16, which allow ambient air to enter housing 12 at one or more inlets 18 travel at least partially through housing 12 before entering into media 14 at one or more outlets 20.

Housing 12 also preferably comprises one or more layers of insulation 22. In one embodiment, air ducts 16 are preferably positioned such that at least a portion of insulation 22 is surrounded at least partially thereby.

Catalyst-coated media 14 can optionally be held in place by one or more media holders 24. One or more initiators 26, which can be electrically-powered or powered otherwise, are preferably disposed in, on, or near media 14, such that media 14 is heated thereby. For initiators 26 which are electrically-powered, one or more electrical connections 28 are preferably provided. Initiator 26 can also include one or more gas fired burners in conjunction with or in lieu of electric initiators. Regardless of the type of heat source for initiator 26, it can optionally be disposed on, under, around, and/or within, catalyst-coated media 14.

Figure 4:
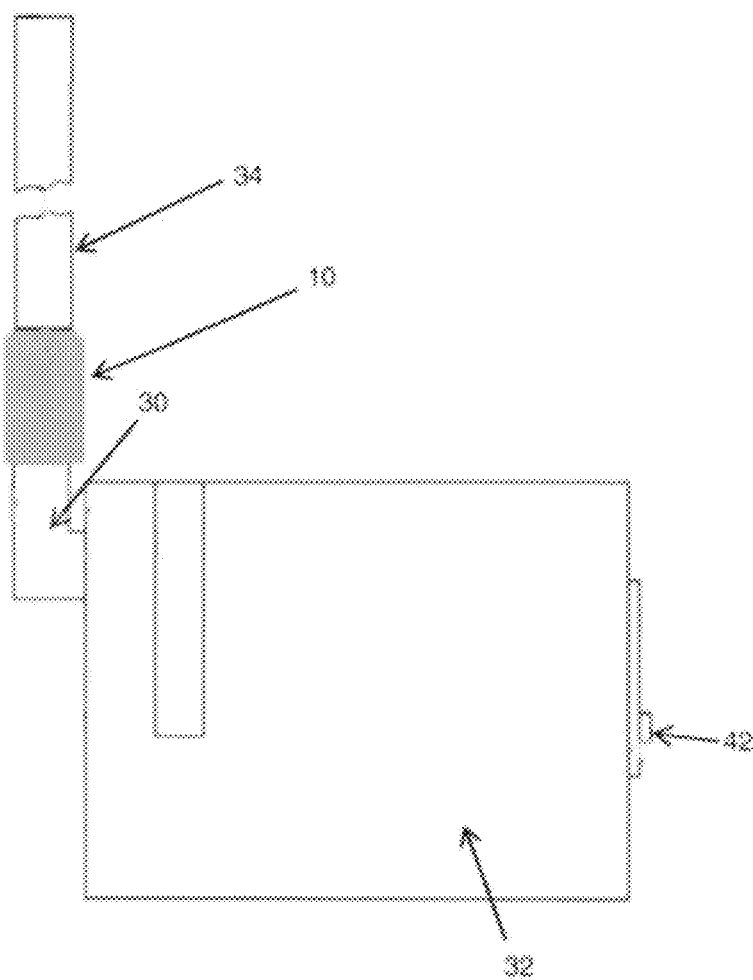
FIG. 4 is a schematic-view drawing which illustrates relative position of an emission control apparatus with respect to other components of a hydronic heater, according to an embodiment of the present invention.
Figure 5:
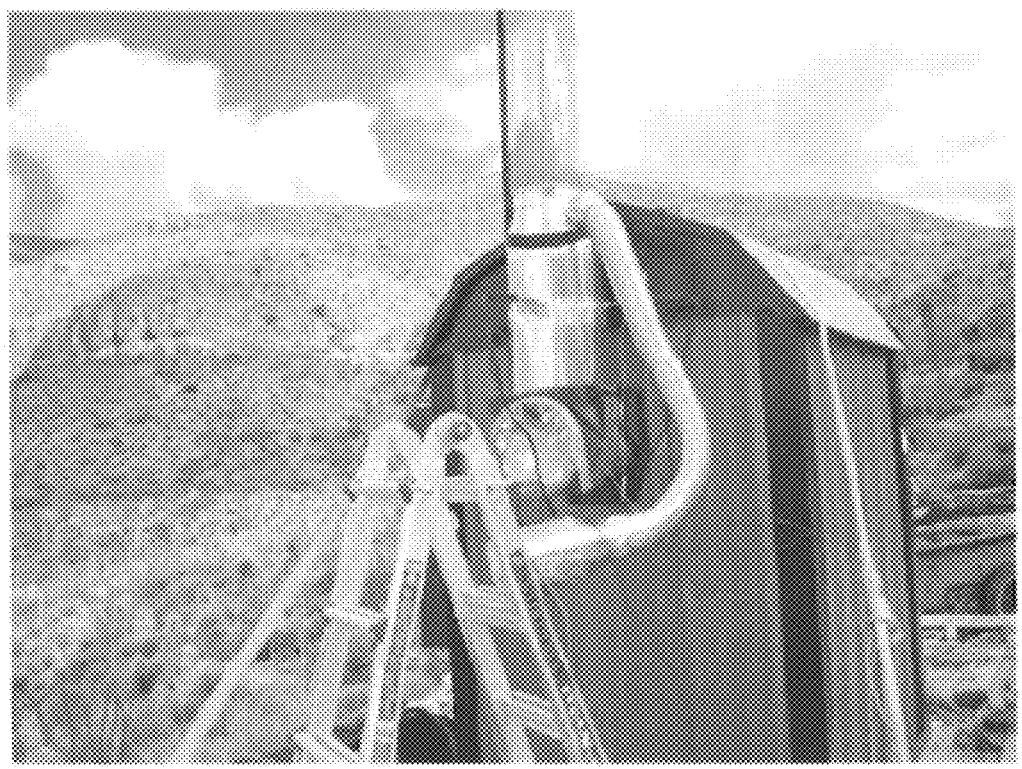
FIG. 5 is a perspective view which illustrates a position of an emission control apparatus installed on an OWB, according to an embodiment of the present invention.

Referring to FIG. 4, in one embodiment, emission control apparatus 10 is preferably disposed between exhaust outlet 30 of OWB 32 and a section of flue pipe 34. Most preferably, emission control apparatus 10 is disposed between exhaust outlet 30 of OWB 32 and the bottom section of flue pipe 34, such that emission control apparatus 10 is near outlet 30, where the temperature of the exhaust gas from OWB 32 is very high.

In one embodiment, upper and lower ends of housing 12 of emission control apparatus 10 preferably comprise dimensions at least substantially consistent with typical flue sections, such that apparatus 10 can be installed onto flue pipe 34 and/or exhaust outlet 30 without requiring any additional components and/or adapters. Alternatively, however, desirable results can still be obtained by embodiments of the present invention which do require additional components and/or adapters.

Figure 3:
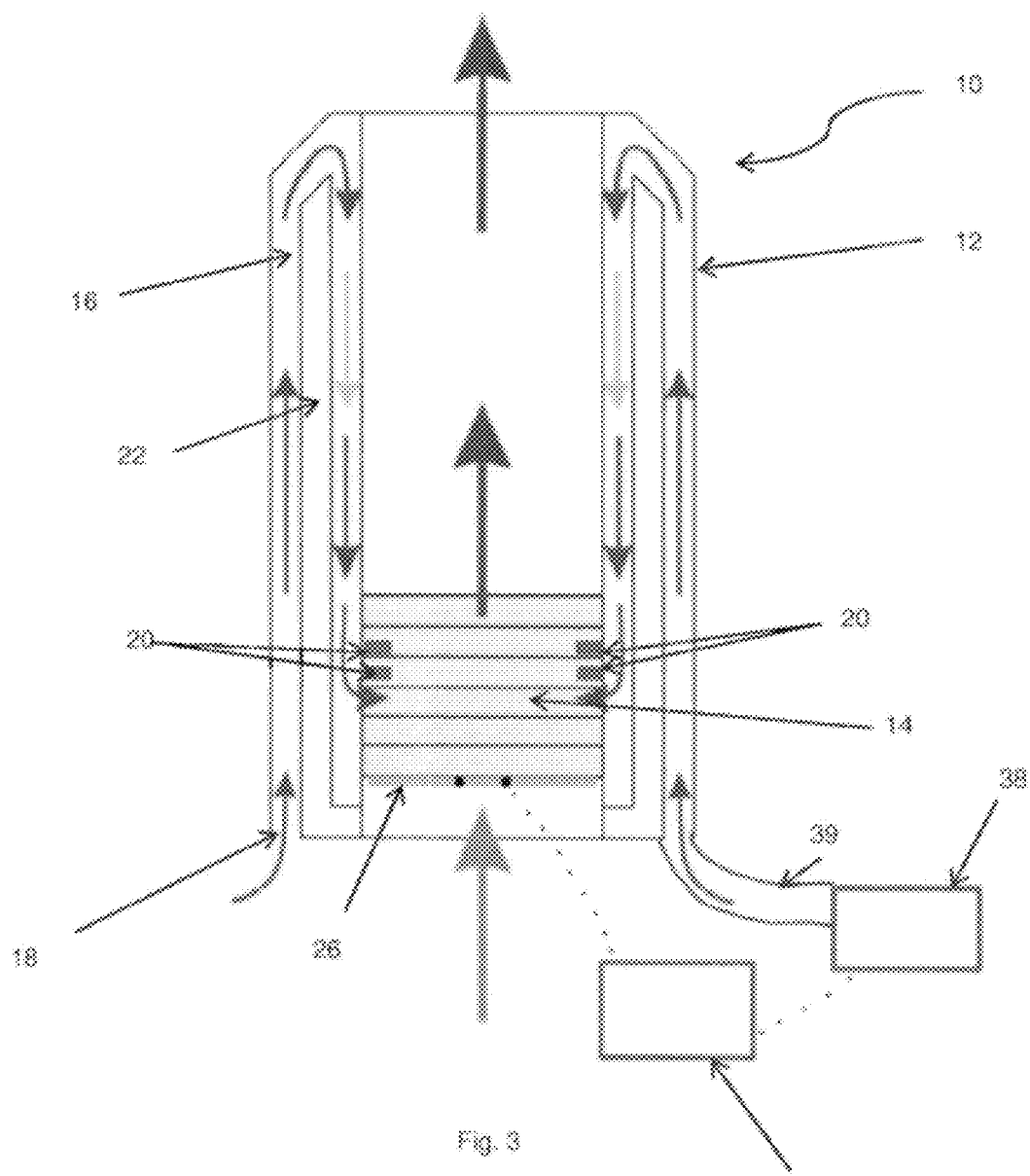
FIG. 3 is a cutaway drawing which schematically illustrates airflow through an embodiment of the present invention.

In one embodiment and as illustrated in FIG. 3, housing 12 preferably directs all of the exhaust from the combustion process of OWB 32 through catalyst-coated media 14. In operation, ambient air is preferably either drawn from convection or is otherwise forced into inlet 18 from fan 38 which can optionally be connected thereto via duct 39. The air preferably travels up through air duct 16, on a cool exterior side of insulation 22, then down on a hot interior side of insulation 22 where it is heated from conduction through the internal wall of housing 12 by hot exhaust gases, before being introduced into media 14 through outlets 20. The fresh air provides additional oxygen to media 14, thus permitting it to accomplish more complete catalysis of organic particulates and other organic pollutants in the exhaust during portions of the high-burn periods.

Preferably, the inner diameter of emission control apparatus 10 is at least substantially the same as that of a typical flue pipe, which can include, but is not limited to, about 6 to about 16 inches, and most preferably about 7-9 inches. Optionally, the outer diameter of emission control apparatus 10 is greater than that of a typical flue pipe. For example, in one embodiment, an outside diameter of emission control apparatus 10 can have a diameter which is about 4 to about 10 inches larger than that of a typical flue pipe.

Housing 12 can optionally be fabricated from a variety of non-combustible materials including but not limited to: a variety of metals and alloys including stainless steel, steel, titanium, etc; a variety of ceramics; and a variety of composite materials such as CFCC (continuous fiber ceramic composite), etc.

In one embodiment, catalyst-coated media 14 can optionally include a catalyst coated ceramic reticulated structure. As used herein, a "reticulated structure" is intended to include any porous, open-celled structure with a large internal surface area, including but not limited to those created by a three dimensional latticework of interconnected ligaments which forms a porous, open-celled structure with a large internal surface area. The surfaces are preferably coated with a catalytic material that converts organic particulates and other harmful pollutants in the OWB's exhaust into harmless compounds.

In one embodiment, the catalyst of the catalyst-coated media 14 preferably lights off at temperatures of at least about 500° F., and more preferably at temperatures of at least about 350° F. or greater. In one embodiment, media 14 is thus preferably positioned where elevated temperatures can be maintained and/or otherwise created.

The one or more catalyst-coated media holders 24 (see FIG. 1) preferably hold catalyst-coated media 14 in a manner where the exhaust flows from the OWB exhaust outlet through media 14, most preferably in an expeditious and/or direct manner. The one or more catalyst-coated media holders 24 can be fabricated from a variety of non-combustible materials including but not limited to one or more metals and/or alloys, including but not limited to stainless steel, steel, titanium; one or more ceramics; one or more composite materials, including but not limited to continuous fiber ceramic composites; combinations thereof, and the like.

In operation, the catalyst cleaner and initiator 26 (see FIG. 3) can optionally be activated, deactivated, and/or otherwise controlled by an electrical control signal generated by a control system of the OWB. Alternatively, catalyst cleaner and initiator 26 can be activated, deactivated, and/or otherwise controlled by a signal from an independent control system, including but not limited to control system 40 of the present invention—if provided. In one embodiment, control system 40 (see FIG. 3) can include one or more microcontrollers, microprocessors, control logic circuits, programmable logic controllers, combinations thereof, and the like. Optionally, the catalyst cleaner and initiator 26 can be turned on before the opening of air inlet door 42 (see FIG. 4) to allow the catalyst cleaner and initiator 26 to obtain a predetermined temperature before air inlet door 42 opens. Catalyst cleaner and initiator 26 can optionally be turned off at the same time that air inlet door 42 is closed. A thermally-activated switch can also optionally be provided, which activates and/or deactivates catalyst cleaner and initiator 26 at one or more predetermined temperatures, which temperatures can optionally coincide with those encountered during a high-burn period where the temperature of the catalyst is sufficiently elevated by the exhaust temperature, such that catalyst cleaner and initiator 26 is deactivated.

An electrical timing delay can optionally be provided by a simple off-the-shelf electronic apparatus that delays the activation and/or deactivation of catalyst cleaner and initiator 26 for a predetermined amount of time. Optionally, the delay can begin upon opening and/or closing of air inlet door 42. The time delay can match the time required to bring the catalyst cleaner and initiator up to peak temperature or another predetermined temperature. The time delay can optionally be variable or non-variable, as can be determined based upon the needs of the purchaser and amount of cost increase associated with a variable unit.

In one embodiment, as best illustrated in FIG. 3, supplemental ambient airflow fan 38 can be provided. Its settings can be determined based on a variety of factors for a given installation, including but not limited to: expected ambient temperatures, elevation, flue length, OWB particulars, combinations thereof and the like. Although any fan configuration capable of causing an increased flow of ambient air into inlet 18 of emission control apparatus 10 can provide desirable results; in one embodiment, if provided, fan 38 preferably comprises relatively low-flow, low-pressure, low-amperage, low-cost configurations, and/or combinations thereof. Optionally, fan 38 can be activated, deactivated, and/or otherwise controlled, based upon a position of air inlet door 42. For example, fan 38 can be activated when air inlet door 42 is opened and deactivated when it is closed. Optionally fan 38 can be activated, deactivated, and/or otherwise controlled based by control system 40.

In one embodiment, when supplemental fan 38 is provided, ambient air inlet 18 preferably only receives air from fan 38. Accordingly, a damper or other mechanism can be provided such that the air from fan 38 does not escape from the system before traveling through emission control apparatus 10. When fan 38 is provided, but is not activated, then ambient air inlet 18 is preferably configured to freely draw ambient air due to the convection of the heated ambient air being drawn into media 18.

In one embodiment, an assortment of installation screws, connectors, brackets, adapters, fittings, combinations thereof, and the like can be provided. The assortment can optionally include a variety of small items that are helpful to install emission control apparatus 10 to an existing OWB. The installation process is preferably simple and straight forward. In one embodiment, emission control apparatus 10 simply stacks like a typical flue pipe and is attached with self-tapping metal screws. The connections for initiator 26 (electrical and/or gas) are preferably industry standard while the connections for an electrical control system, if provided, are also industry standard. Brackets will be supplied for routing of the electrical wires.

As illustrated in FIG. 3, warm air from the OWB preferably enters the bottom of emission control apparatus 10 from OWB exhaust outlet 30. Cool ambient air enters inlets 18, which can be on the outer bottom of emission control apparatus 10, and flows upward due to the draw created from the hot air in flue pipe 34 (see FIG. 4), above emission control apparatus 10. The cool ambient air continues upward, outside of insulation 22, and then flows back downward through an un-insulated duct located next to the hot exhaust gases coming out of catalyst-coated media 14. The cool ambient air increases in temperature as it flows downward. When it flows through a series of outlets 20 directly into catalyst-coated media 14 where it mixes with the warm/hot OWB exhaust, it is already at an increased temperature, thereby maintaining temperatures where effective catalytic action occurs. The orientation and/or placement of ambient air duct 16 of emission control apparatus 10 are not essential and desirable results can thus be achieved with alternative configurations of air ducts 16 so long as ambient air can be caused to enter at one or more ambient air inlets 18 and exit at one or more ambient air outlets 20. In one embodiment, air ducts 16 are preferably configured such that ambient air is directed in a first direction through a portion of air duct 16 which resides outside of an exterior portion of insulator 22, before changing directions and being caused to travel in another direction through a portion of air duct 16 which is preferably disposed between insulator 22 and exhaust gasses traveling through an exhaust passageway within housing 12.

Figure 6:
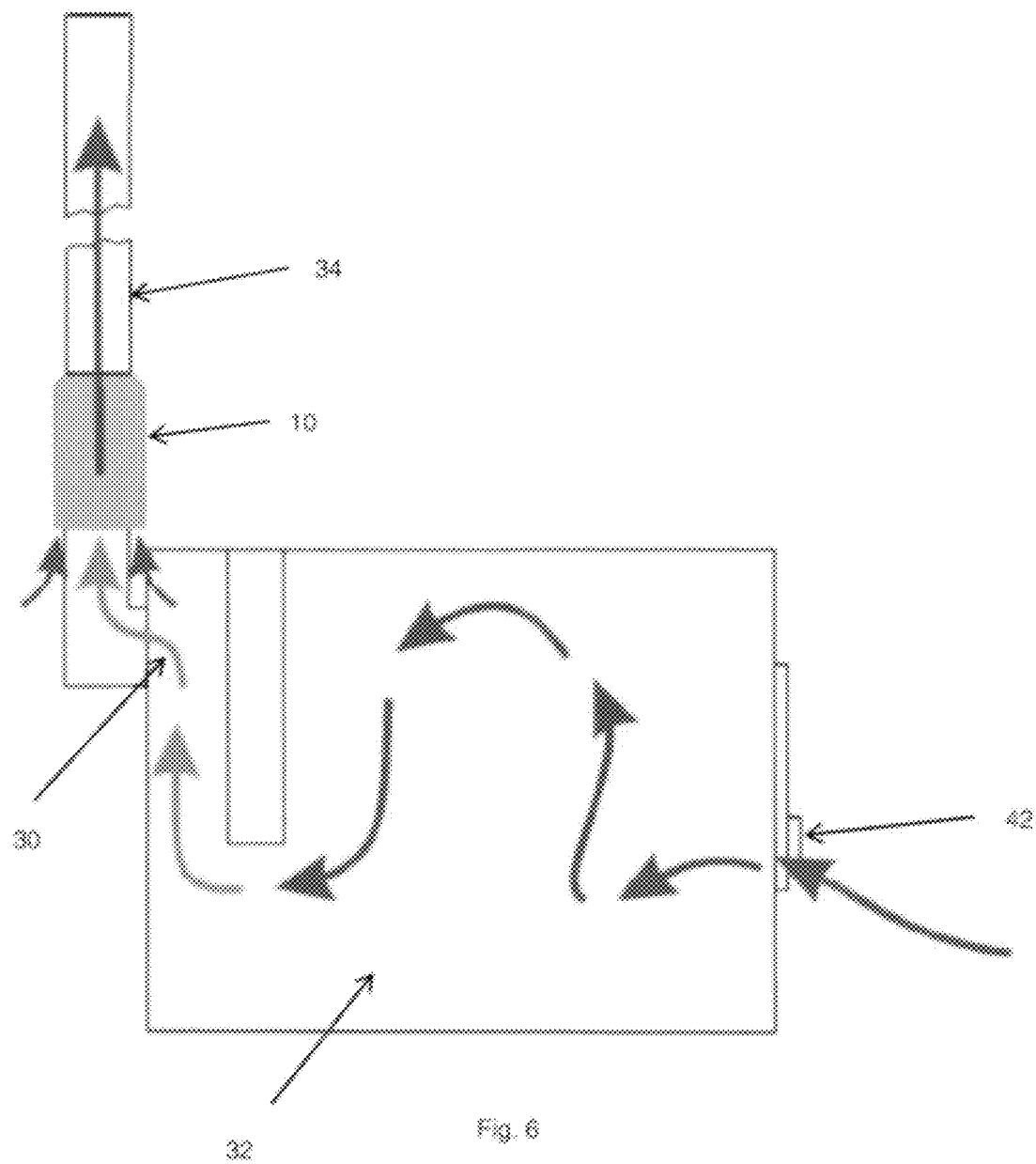
FIG. 6 is a schematic-view drawing which illustrates airflow through an OWB with an emission control apparatus installed thereon.
Figure 7:
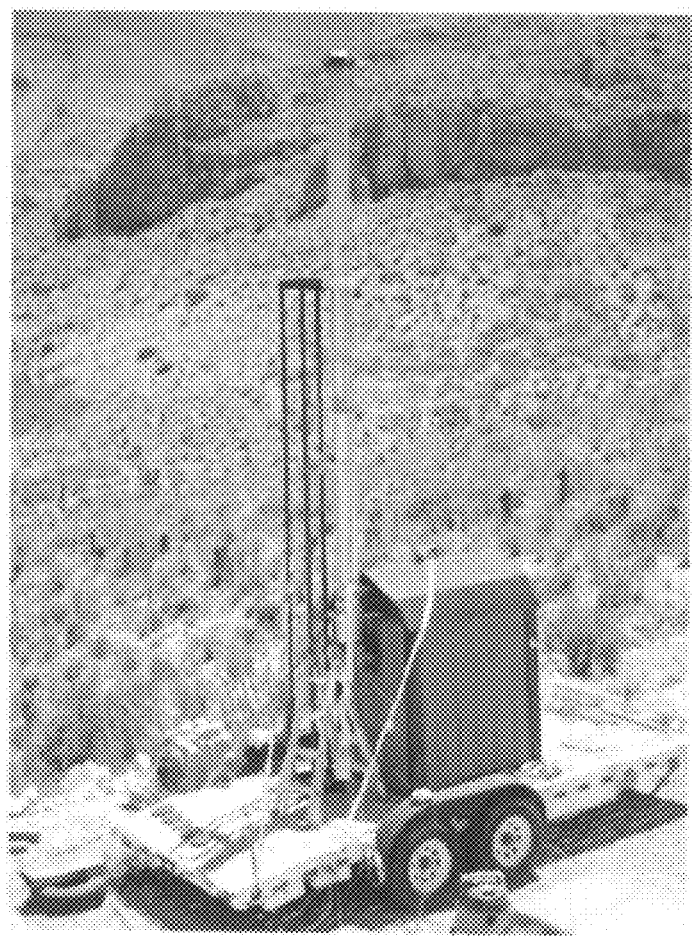
FIG. 7 illustrates an embodiment of a completed assembly wherein an emission control apparatus is disposed on a hydronic heater.
Figure 8:
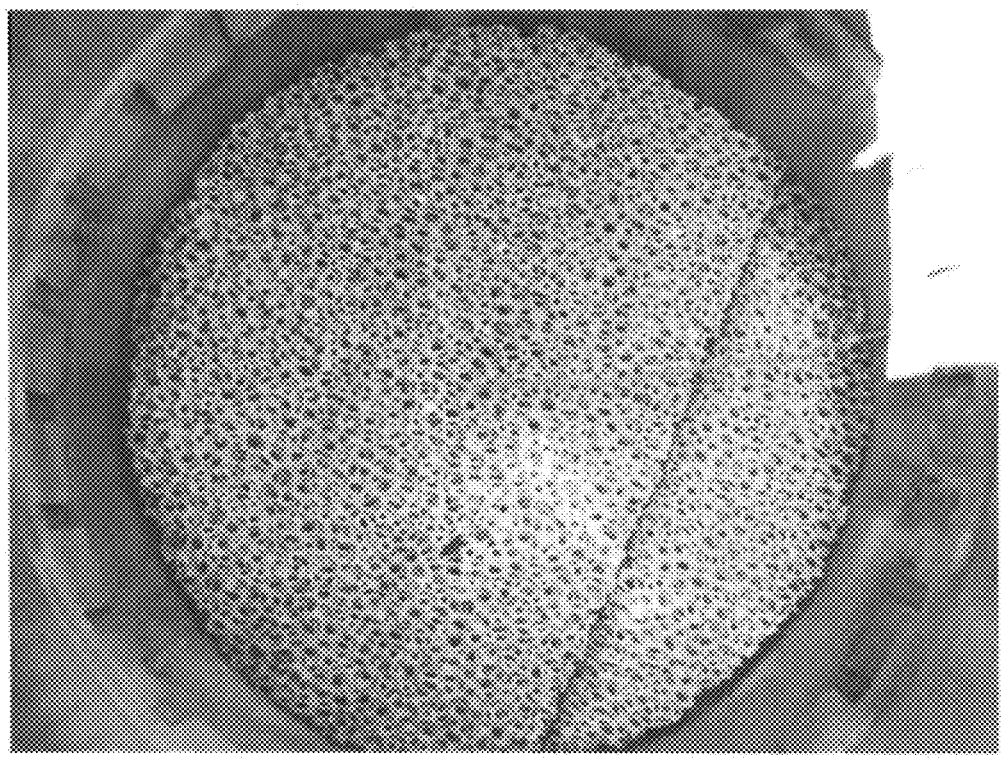
FIG. 8 illustrates a top portion of a stack of catalyst-coated media after a high-burn portion of a test of a prototype of an embodiment of an emission control apparatus was performed.

As illustrated in the embodiment of FIG. 6, cool ambient air preferably enters air inlet door 42, which is typically located near the bottom of the firewood loading door. The air enters combustion chamber of OWB 32 where a portion of the oxygen contained within it is used in the combustion process with the fuel. A significant portion of the heat produced by the combustion process is transferred to the surrounding water located above, to the sides and within chambers in combustion chamber of OWB 32. By the time the exhaust is drawn out of OWB 32, a significant portion of the heat has been exchanged to the water.

In one embodiment, catalyst-coated media 14 converts the organic particulates and species gas pollution into harmless water vapor and carbon dioxide.

In another embodiment of the present invention, catalyst-coated media 14 comprises a ceramic reticulated structure.

OWB's typically cycle between high-burn and low-burn periods. During the low-burn period, the exhaust temperature is very low and little or no catalysis occurs. However, there are also a reduced number of particulates or other harmful pollutants being produced. Therefore, in one embodiment of the present invention, emission control apparatus 10 remains substantially inactive during this period. In the high-burn period, however, there are large amounts of organic particulates, other harmful organic pollutants, and carbon monoxide that are produced by an OWB. An OWB is designed to exchange the heat produced by the combustion of the fuel into a water-filled jacket that surrounds the combustion area. Nevertheless, during the high-burn cycle, there is plenty of heat to fire the catalyst. Coming out of the low-burn cycle and transitioning into the high-burn period, the catalyst cleaner and initiator 26 below the catalyst bed burns off particulate matter that accumulated during the low-burn period and raises the temperature of the catalyst bed, both of which increase the catalytic efficiency. In one embodiment of the present invention, the catalyst cleaner and initiator is turned on by an OWB control system signal that is sent to the air inlet door to open it and start the high-burn period. The signal can then optionally immediately turn on the catalyst cleaner and initiator, while the opening of the air inlet door is delayed. The length of the time delay is preferably long enough for the catalyst to come up to a preheat temperature before the opening of the air inlet door. Then, when the door opens and the hot pollutants rush out of the combustion chamber, the catalyst-coated media rapidly reaches the light off temperature and effective catalysis of those pollutants occurs. Once the catalyst-coated reticulated structure is catalytically active, there may be enough particulates and other organic pollutants in the exhaust to maintain the catalyst at an efficient conversion temperature. When the OWB's control signal is sent to close the air inlet door, the catalyst cleaner and initiator preferably turns off, optionally simultaneously, as the system transitions into low-burn.

Embodiments of the present invention preferably provide one or more of the following:

A significant decrease in particulates and species gas pollution accomplished by emission control apparatus 10 when installed in either an existing or newly installed OWB. Emission control apparatus 10 results in a reduction in harmful airborne compounds being released into the atmosphere allowing OWBs to be used in more locations throughout the country and world.

The use of more OWBs results in a greater use of renewable fuels (i.e. wood).

The increased use of renewable fuels results in a decrease in dependency on foreign oil.

The use of emission control apparatus 10 can increase the energy efficiency of the OWB by using the organic particulates and species gases as additional fuel that is turned into heat.

The decrease in particulates and species gas pollution accomplished by emission control apparatus 10 when installed in either an existing or newly installed OWB results in a cleaner air shed in the area where the OWB is operating.

The more efficient performance of catalyst-coated media 14 results in increased heating of catalyst-coated media 14 by an exothermic chemical reaction of organic particulates and carbon monoxide into carbon dioxide and water.

The electrical power used to operate and control the thermostatically controlled initiators and supplemental fan can be obtained from the OWB.

The decrease in particulates created by emission control apparatus 10 in conjunction with the appropriate catalyst-coated media results in a cleaner OWB exhaust flue resulting in reduced cleaning costs.

The significant decrease in particulates created from an OWB with apparatus according to embodiments of the present invention can result in a cleaner exhaust flue resulting in a reduction of flue fires.

Emission control apparatus 10 can be configured in a way to permit easy installation in the vast majority of existing OWBs.

Removes and/or reduces carbon monoxide emissions, thereby making the local environment safer.

In one embodiment of the present invention, an entire retrofit of emission control apparatus 10 is preferably installed outside of OWB 32 (except for electrical hookup), making it very easy to add to existing OWBs. Catalyst-coated media 14 is preferably located very close to the outlet of OWB 32 in order to maintain higher temperatures required for good catalytic action.

The electric initiator of an embodiment of the present invention accomplishes a variety of functions. For example, it heats up catalytic coated media 14 to attain the catalytic light-off temperature in a shorter period of time at the start of a high burn period. The initiator helps maintain the catalytic light-off temperature for a longer period of time as the fire lowers after a high burn period. The initiator cleans off the surface of catalytic coated media 14 at the beginning of a high burn period of material that is "filtered" out during a low burn period. The initiator can be configured to operate from a standard 110 volt, 15 amp common household electrical circuit, or any other available electrical source. The initiator preferably turns off during low-burn periods to save on electrical costs.

Referring now to FIGS. 22-25, an embodiment of the present invention is illustrated wherein assembly 99 is preferably formed from inner assembly 100, outer assembly 106, and inlet assembly 114. In one embodiment, inner assembly 100 can include bottom section 101, which can optionally be about 2 feet tall, which can have a flue pipe, which forms an inner wall of a heat exchanger, attached to its top portion and which flue pipe can have top plate 104 attached to its top portion. Optionally, the flue pipe above bottom section 101 can have a length of about 4 feet. Optionally, additional sections of flue pipe, which can include standard flue pipe, can be disposed above top plate 104.

Figure 22:
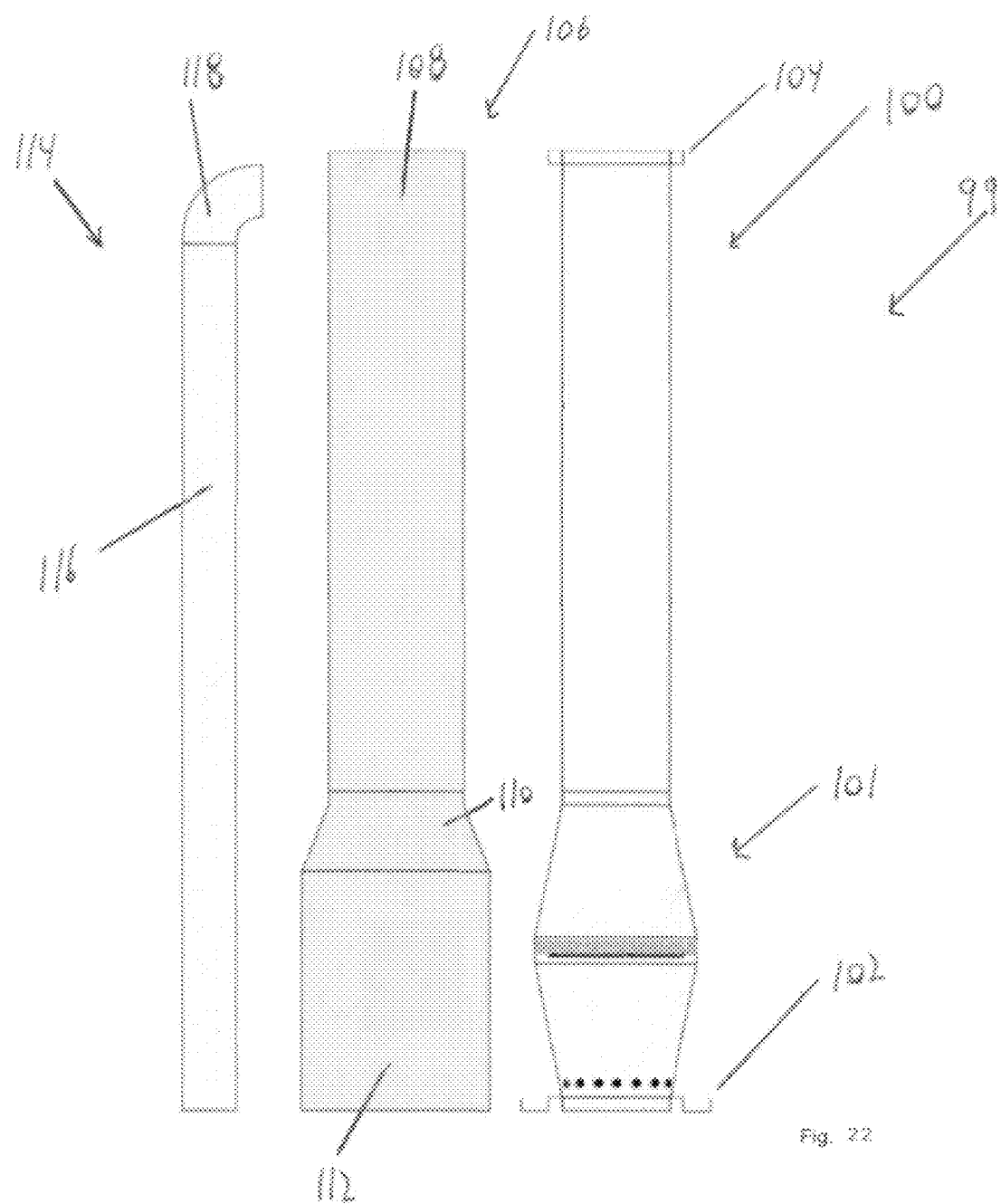
FIGS. 22-25 illustrate various views of an embodiment of the present invention and components thereof.

As further illustrated in the partially-disassembled view of FIG. 22, inner layer 100, preferably formed from stainless steel and can have a diameter which expands at its bottom section 101, for example, a diameter of about 8 inches that expands out to about 12 inches, (illustrated as the central portion of bottom section 101, at a distance of about one foot above its bottom. Plates 102 and 104 can be disposed on the top and bottom and preferably extend out to the outer layer 106 to provide flow blockage on the top and bottom. Bottom plate 102 is preferably able to allow the assembly to fit around a protrusion on an OWB 102 (see FIGS. 24 and 25), which can include a protrusion of about 10 inches in diameter. Top plate 104 is preferably able to connect to other types of flue pipe, including but not limited to 8" double walled pipe.

Outer layer 106 is preferably formed from galvanized steel layer and can include pipe 108, on top of transition 110, and lower pipe 112, below transition 110. Lower pipe 112 can optionally include dimensions of about and a 4' long and about 10.5" in diameter. Preferably inner assembly 100 nests within outer assembly 106, thus forming a void between them.

Figure 23:
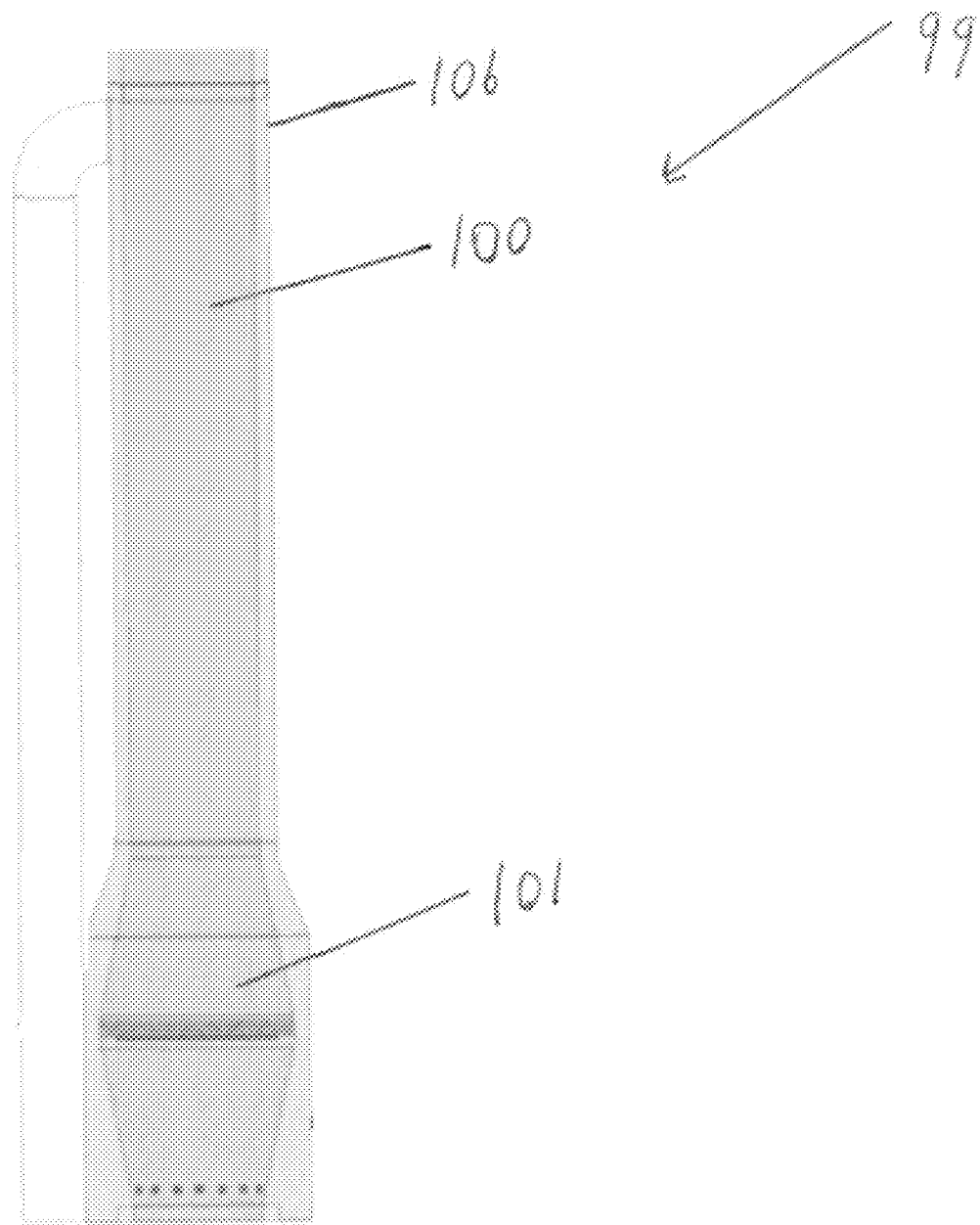
Figure 24:
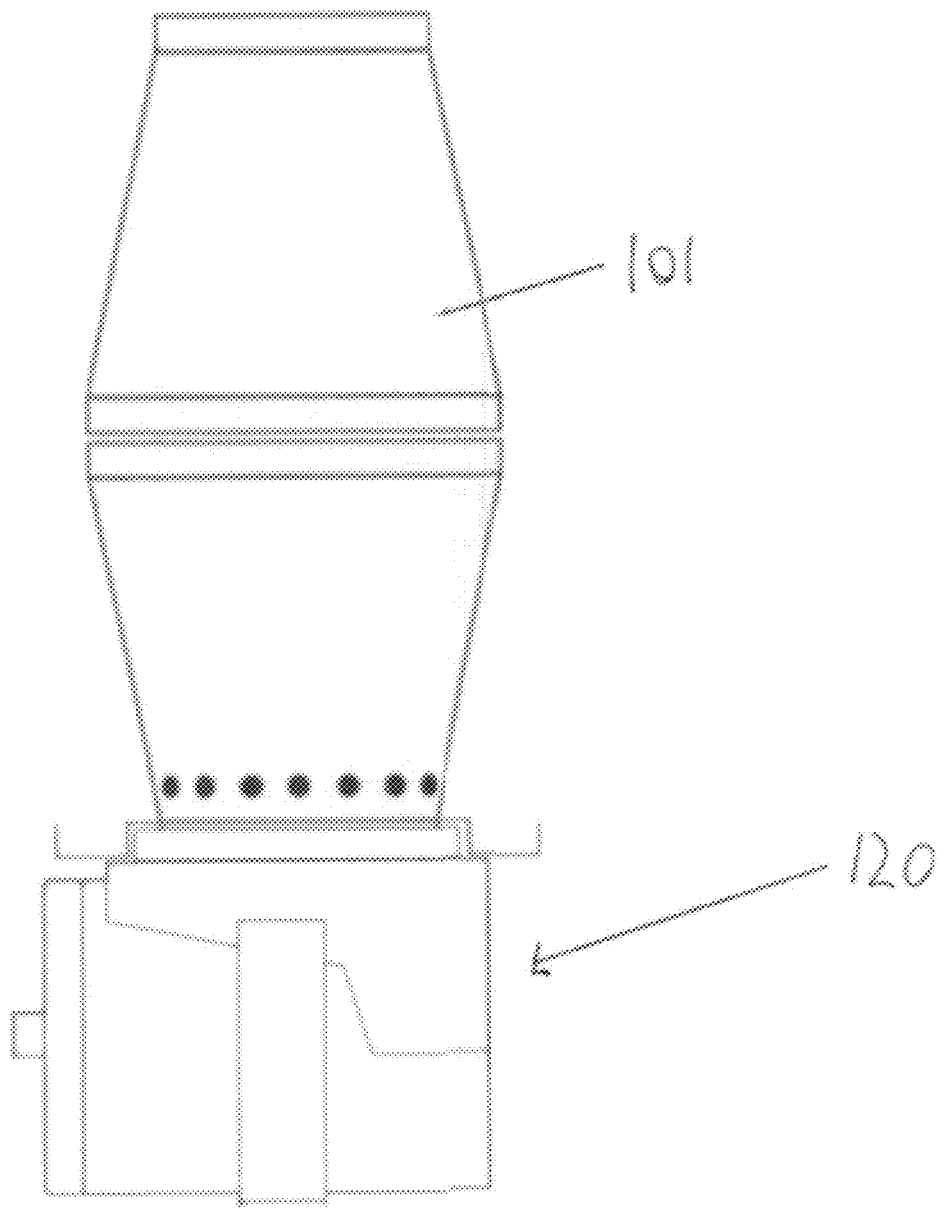
Figure 25:
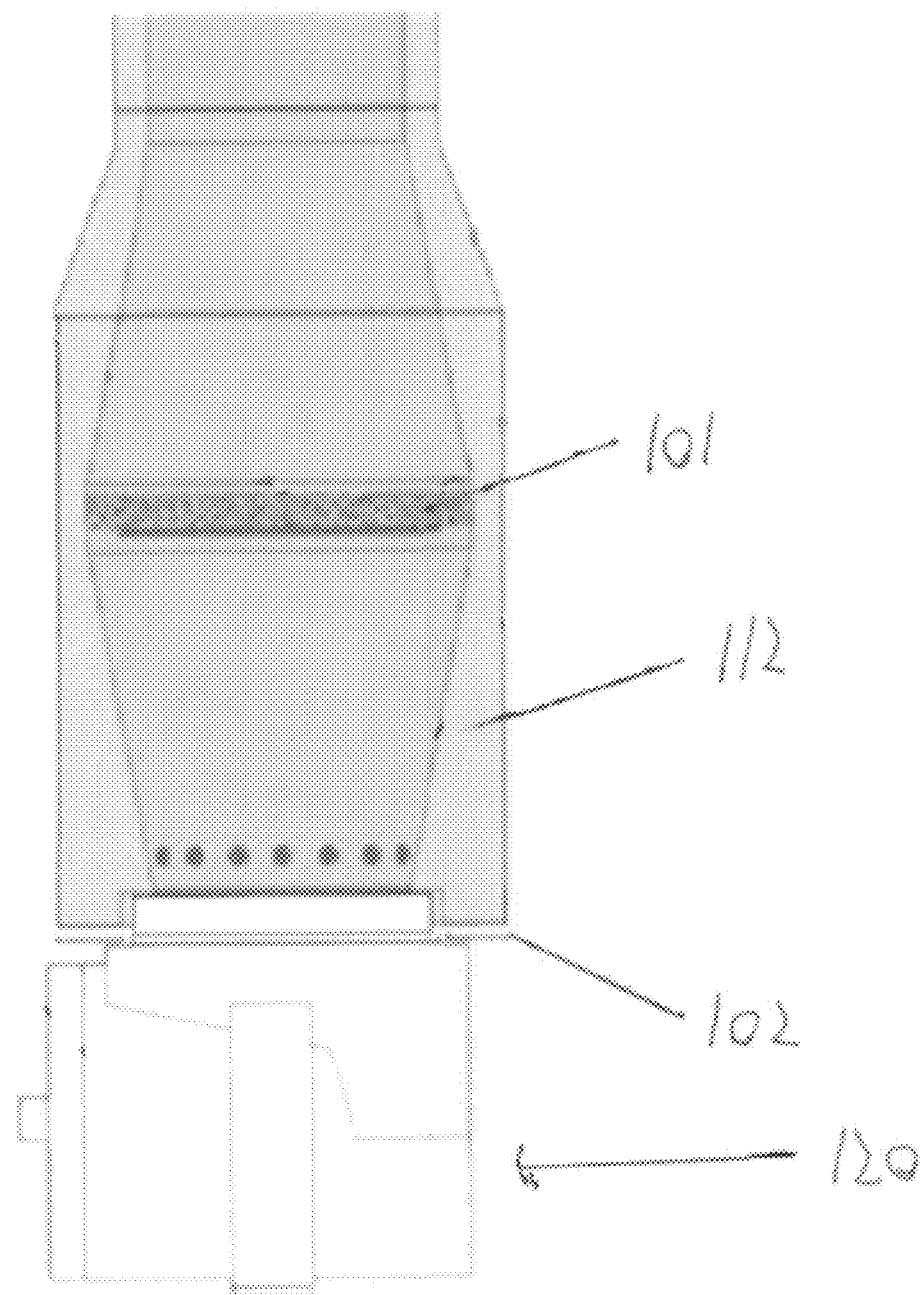

Air inlet section 114 can include tube 116, which is preferably open on its bottom, and 90° turn 118 on top that connects into an opening in outer layer 106 such that the void between inner layer 100 and outer layer 106 is communicable therewith. Optionally, air inlet section 114 can include a 4" diameter. Optionally, various components can twist lock into place. FIG. 23 illustrates nested and completed assembly 99. FIGS. 24 and 25 illustrate the connection formed by OWB, inner bottom section 101, and lower pipe 112 of outer portion 106.

In one embodiment, a section of pipe, which can be about 1 foot in length can be added to the 12 inch diameter portion of inner layer 100 can be added, as well as and another that can be added to the 15" outer layer.

One embodiment of the present invention, as best illustrated in FIG. 23, preferably comprises a venturi disposed before an emission control apparatus. The venturi of this embodiment, preferably induces ambient airflow into the exhaust stream prior to interacting with catalyst-coated media in order to provide additional oxygen required in some portions (for example, the first few high burn periods after fuel loading) of the operation. The venturi also preferably provides an increased cross sectional area of catalytic substrate (for example, about a 12" diameter instead of about an 8" diameter) that accomplishes a number of things, including but not limited to, reducing backpressure, increasing catalytic surface area exposed to the exhaust stream, and/or reducing thickness of required catalytic coated media. The venturi can also comprise only a bottom (downstream) portion of a typical venturi in order to: keep the back pressure low, reduce overall height of the unit, reduce the complexity of the unit, and/or reduce the amount of material used to build the unit.

In one embodiment of the present invention an isolated area between the inner flue pipe (preferably, for example, about 8 inches) and the outer flue pipe (preferably, for example, about 10 inches) (and pipe around the venturi portion (preferably, for example, about 15 inches)) that constrains the flow of the ambient air (air-to-air heat exchanger) provides a number of benefits, including but not limited to:

Acting as a heat exchanger to heat up the ambient air to an elevated temperature prior to mixing into the exhaust flow in order to prevent significantly lowering the temperature at the catalytic coating media;

Accomplishing the heat exchange process primarily downstream (above) of the catalytic coating media in order to not significantly lower the temperature at the catalytic coating media;

The airflow of the ambient air through this area is "automatically" regulated by the amount of airflow up through the rest of the flue since a venturi effect is accomplished by the velocity of the airflow in the inner flue; and/or Insulates the inner flue like a normal double walled flue pipe in order to maintain a high temperature exhaust flow to maintain good draft and temperatures high enough to prevent creosote buildup (although the amount of the buildup is dramatically reduced by apparatuses constructed in accordance with embodiments of the present invention).

The ambient air intake pipe of an embodiment of the present invention preferably provides a variety of benefits, including but not limited to:

Providing a path for the ambient air to enter the air-to-air heat exchanger; and/or During the start-up process of each high burn period, it provides a cool-air-filled chamber that produces a slightly higher pressure than the hot-air-filled main flue blocked by the back-pressure creating catalytic material. This results in the normal draft process created by a chimney—thereby allowing the OWB exhaust to continue up through the catalytic coating media instead of taking an easier path up through the heat exchanger, if the ambient air entry was located at the top of the heat exchanger.

In one embodiment of the present invention, two lengths of flue pipe above an emission control apparatus according to an embodiment of the present invention are preferably used to provide proper draft in order for the entire OWB to work properly. The more flue pipe, the higher the draft.

Referring now the figures generally, in one embodiment, insulator 22 is preferably formed from a thermal insulating material having a thermal conductivity k-value of less than about 15, more preferably less than about 8, and most preferably less than about 2. In one embodiment, insulator 22 comprises a solid material. In one embodiment, the apparatus of the present invention is not disposed on a vehicle. In one embodiment, catalyst-coated media 14 is removably positionable. In one embodiment, media 14 can be rotatably-positionable such that it can optionally be rotated. For example such that a primary axis of it is orientated in a substantially vertical plane, thus allowing exhaust to pass freely by it. In one embodiment, emission control apparatus 10 is attached to an outdoor wood-fired boiler as that item is conventionally known and not as it is defined herein. In one embodiment, housing 12 can be provided without insulator 22 and without ambient air ducts 16. In one embodiment, catalyst-coated media 14 comprises a reticulated structure. In one embodiment, catalyst-coated media 14 does not comprise a honey-comb structure. In one embodiment, ambient air can selectively be opened and/or closed via a valve, damper plug or other similar structure, including but not limited to a butterfly valve. Optionally, ambient air can be opened and/or closed electrically, manually, thermally (for example via a bimetallic deflection), pneumatically and/or a combination thereof. Optionally one or more sensors, including but not limited to temperature, oxygen, and/or flow sensors can be used to determine when to open and or close the flow of ambient air.

INDUSTRIAL APPLICABILITY

The invention is further illustrated by the following non-limiting example.

Example 1

Figure 9:
Figure 10:

FIGS. 9-21 illustrate an embodiment of construction and installation of an emission control apparatus to an OWB. As illustrated therein, the apparatus included an inner and outer pipe. The smaller pipe contained the catalytic component. When assembled, the smaller pipe fit inside the larger pipe to create a double wall design. Both pipe assemblies were the same height (see FIG. 9). The assembled apparatus is illustrated in FIG. 10. The wiring for the initiator was fully integrated into the unit. The 4" intake pipe appears on the left. The top and bottom were sealed off to create a heat exchanger between the inner and outer wall.

Figure 11:
Figure 12:
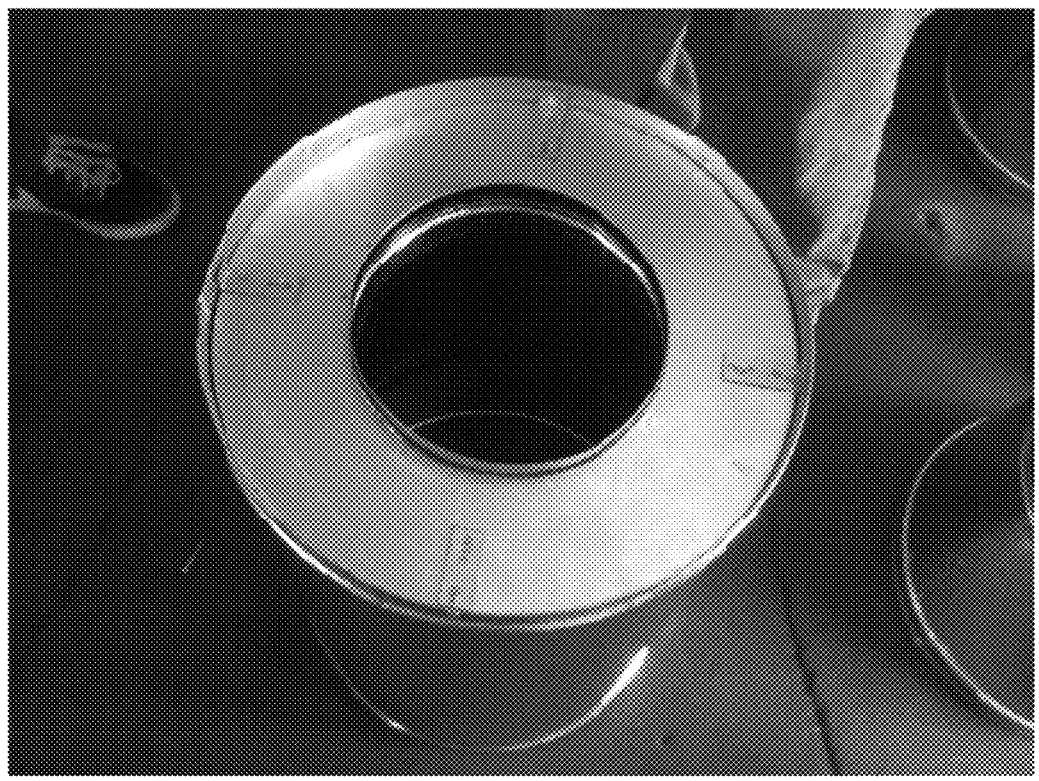

Referring now to FIG. 11, to begin the assembly of the unit, we started with the lower outer piece. It was 15" in diameter and it was sealed off on the bottom (see FIG. 12). The bottom of the lower outer piece had a metal ring that blocked off the opening between the 15" outer and the 8" inner. The bottom lip of the 8" inner was able to extend into the exhaust port on the back of the OWB. The ring was mechanically attached. Silicone was applied to seal off the inner and outer circumference of the ring to create an air-tight heat exchanger. A gasket was applied to the area around the 8" pipe lip. This is the sealing surface against the exhaust port. When this section is turned upside-down the lower conical piece makes up the combustor enclosure.

Figure 13:
Figure 14:
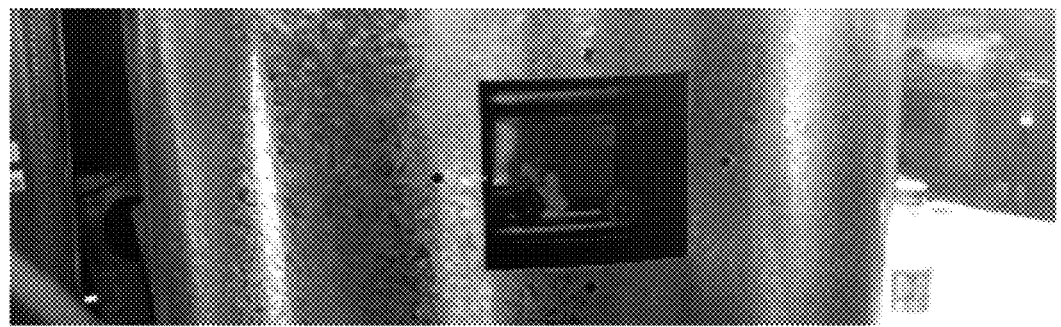

Referring now to FIG. 13, the combustor and initiator were installed as a one-piece unit in a 4" high section of vent pipe. Retainers on both the top and bottom held the initiator and combustor in place. This section was installed into the lower outer piece with the combustor on top and the initiator on the bottom. These components had all of the interlocking surfaces flattened out for easy assembly and disassembly during fabrication and test, although it is preferable that they snap together. It was ensured that the two electrical connections were lined up with the window opening as illustrated in FIG. 14.

Figure 15:

Referring now to FIG. 15, the upper conical piece was installed onto the combustor assembly. Next, the longest section of the 8" inner pipe was installed. Again, mechanical detents for interlocking pieces were flattened out. Next the largest conical piece was installed. This piece transitioned from 15" to 12" for the outer pipe. The next step was to install the top outer pipe onto the large conical section. The area between the inner and outer walls was used as a heat exchanger for the supplemental air supply. The tops of each pipe terminated at the same height.

Figure 16:
Figure 17:
Figure 18:
Figure 19:
Figure 30:
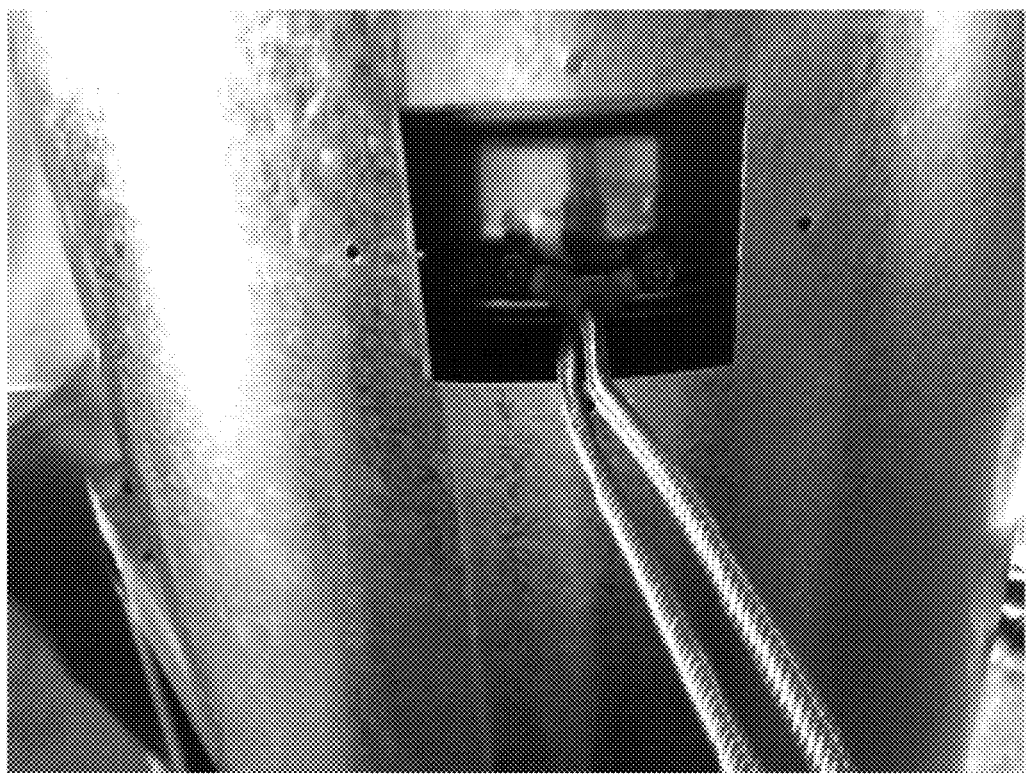
Figure 21:

The area at the top of the apparatus between the inner and outer pipe was sealed off with another ring similar to the ring on the bottom of the unit. The ring rested against the lip on the inner pipe. Silicone was used to seal the inner and outer circumference of the ring as illustrated in FIG. 16.

There were interlocking detents on the inner pipe that were intentionally flattened out during development assembly and dis-assembly, therefore, self-tapping screws or other fasteners were used to ensure that the piping sections stayed together during the emissions testing.

Next, the 4" intake pipe was installed that was used for the ambient air inlet. The top of the outer pipe had an extruded connection to attach the 4" 90 degree elbow. The elbow was pre-drilled so the screws were removed and re-inserted in the elbow to secure the connection. The 90 degree elbow was installed facing down (see FIG. 17). Silicone was applied around the joint to seal the ambient air system.

After the elbow was connected, the longer section of 4" pipe was attached, followed by the smaller bottom section of 4" pipe. A bracket was installed on this section illustrated in FIG. 18, which was subsequently attached to the larger pipe with self-tapping machine screws. At that point, the unit was structurally assembled.

Next, the electrical wiring was connected to the initiator through a square opening in the side of the outer pipe. The two connectors that were used are visible in FIG. 19. The nuts and lock washers were then removed from the connections on the initiator inside the window, as illustrated in FIG. 20. Those nuts were used to attach the two wires of the electrical connection that was provided. The nuts and lock washers securely attached the two wires to the Terminals. The cover was then slid over the connecting wires and secured to the body of the apparatus with four screws. The two screws were then tightened around the wires on the cover plate, thereby securing the wires in place. The emission control unit was then completed, weighing approximately 55 pounds, and was ready for test (see FIG. 21). The apparatus could have been made on the exhaust port of the OWB or it could have been pre-assembled and lifted onto the exhaust port. Once in place on the OWB, the unit was secured with the support strap on the back of the OWB.

The preceding example can be repeated with similar success by substituting the generically or specifically described components and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An emission control apparatus comprising:
    a housing comprising an internal wall and an external wall, said internal wall defining an exhaust flow path and having a catalyst-coated media disposed therein;
    at least one ambient air duct disposed within said housing between said internal wall and said external wall, where each said ambient air duct includes an air inlet in said external wall of said housing and an air outlet in said internal wall of said housing in communication with said catalyst-coated media;
    insulation disposed within said housing between said internal wall and said external wall; and
    wherein said at least one ambient air duct and insulation are positioned such that, during operation of said emission control apparatus, ambient air enters through the air inlet, travels upwardly through said ambient air duct on a cool exterior side of said insulation before turning and traveling back down on a hot interior side of said insulation where the ambient air is heated from conduction through said internal wall of said housing before being introduced into said catalyst-coated media.

2. The emission control apparatus of claim 1 wherein said housing comprises a first end and a second end.

3. The emission control apparatus of claim 2 wherein said first and second ends of said housing are connectable with a conventional flue pipe.

4. The emission control apparatus of claim 1 further comprising a catalyst cleaner and initiator.

5. The emission control apparatus of claim 4 wherein said catalyst cleaner and initiator is disposed such that it heats said catalyst-coated media.

6. The emission control apparatus of claim 4 wherein said catalyst cleaner and initiator is electric.

7. The emission control apparatus of claim 1 further comprising a fan.

8. The emission control apparatus of claim 7 wherein said fan comprises an outlet which is communicable with at least one said ambient air inlet.

9. The emission control apparatus of claim 1 further comprising a control system.

10. The emission control apparatus of claim 9 wherein said control system controls an element selected from a list consisting of a fan, a catalyst cleaner and initiator, and a combination thereof.

11. The emission control apparatus of claim 1 wherein said air outlet comprises a plurality of openings.

12. The emission control apparatus of claim 1 wherein said housing is arranged such that it is at least substantially vertically orientated, such that said catalyst-coated media is disposed in a lower portion of said exhaust flow path and said air inlet is disposed on a lower portion of said external wall.

13. The emission control apparatus of claim 1 further comprising a catalyst-coated media holder.

14. The emission control apparatus of claim 1 wherein said catalyst-coated media comprises a reticulated structure.

15. An emission control apparatus disposed on an outdoor wood-fired boiler comprising:
- a housing comprising an internal wall and an external wall, said internal wall defining an exhaust flow path and having catalyst-coated media disposed therein;
- an ambient air duct disposed within said housing between said internal wall and said external wall, said ambient air duct comprising an air inlet in said external wall of said housing and an air outlet in said internal wall of said housing in communication with said catalyst-coated media;
- insulation disposed within said housing between said internal wall and said external wall;
- a catalyst cleaner and initiator disposed within said exhaust flow path near said catalyst-coated media, said catalyst cleaner and initiator comprising an electrical connection; and
- wherein said ambient air duct and insulation are positioned such that, during operation of said emission control apparatus, ambient air enters through said air inlet, travels upwardly through said ambient air duct on a cool exterior side of said insulation before turning and traveling back down on a hot interior side of said insulation where the ambient air is heated from conduction through said internal wall of said housing before being introduced into said catalyst-coated media.

16. An emission control apparatus disposed on an outdoor wood-fired boiler comprising:
- a housing comprising an internal wall and an external wall, said internal wall defining an exhaust flow path and having a media holding structure disposed therein;
- an ambient air duct disposed within said housing between said internal wall and said external wall, said ambient air duct comprising an air inlet in the external wall of said housing and an air outlet in said internal wall of the housing in communication with said media holding structure;
- insulation disposed within said housing between said internal wall and said external wall;
- said housing comprising an upper end attachable to a flue pipe;
- said housing comprising a middle portion, said middle portion comprising a cross sectional area that is at least 30% larger than a cross sectional area of the flue pipe; and
- wherein said ambient air duct and insulation are positioned such that, during operation of said emission control apparatus, ambient air enters through said air inlet, travels upwardly through said ambient air duct on a cool exterior side of said insulation before turning and traveling back down on a hot interior side of said insulation where the ambient air is heated from conduction through said internal wall of said housing before being introduced near said media holding structure.

17. The emission control apparatus of claim 16 wherein said media holding structure is disposed within said middle portion of said housing.

18. The emission control apparatus of claim 16 wherein said media holding structure is configured such that media held thereby can be rotatably positioned about an at least substantially horizontal axis.

19. The emission control apparatus of claim 16 further comprising a reticulated structure of catalyst-coated media disposed on said media holding structure.

* * * * *